United States Patent [19]

Ryan

[11] Patent Number: 5,708,846
[45] Date of Patent: Jan. 13, 1998

[54] SYSTEM FOR RETRIEVING INITIAL DATA SEQUENCE CORRESPONDING TO NEXT DATA SEQUENCE WHILE LOCATING NEXT DATA SEQUENCE WHEN BRANCH POINT IS REACHED DURING CURRENT DATA SEQUENCE

[75] Inventor: Lawrence D. Ryan, Princeton Junction, N.J.

[73] Assignee: Intel Corporation, Santa Clara, Calif.

[21] Appl. No.: 394,156

[22] Filed: Feb. 24, 1995

[51] Int. Cl.$^6$ .................................................. G06F 15/02
[52] U.S. Cl. .......................................................... 395/827
[58] Field of Search ................................. 395/153, 154, 395/162, 600, 650, 800, 438, 445, 464, 383, 182.04, 827, 830, 834, 837, 839–840, 580–586, 427, 806–807, 509, 526; 358/448, 450; 345/185; 382/284, 305; 386/46, 52, 66

[56] References Cited

U.S. PATENT DOCUMENTS

| | | | |
|---|---|---|---|
| 4,447,877 | 5/1984 | Grondalski | 395/557 |
| 4,649,380 | 3/1987 | Penna | 345/127 |
| 5,083,860 | 1/1992 | Miyatake et al. | 352/129 |
| 5,157,511 | 10/1992 | Kawai et al. | 386/68 |
| 5,164,865 | 11/1992 | Shaw | 360/72.2 |
| 5,225,904 | 7/1993 | Gollin | 348/410 |
| 5,287,230 | 2/1994 | Kamide et al. | 360/60 |
| 5,365,384 | 11/1994 | Choi | 348/567 |
| 5,384,598 | 1/1995 | Rodriguez et al. | 348/384 |
| 5,393,071 | 2/1995 | Best | 463/35 |
| 5,434,678 | 7/1995 | Abecassis | 386/52 |
| 5,440,401 | 8/1995 | Parulski et al. | 386/124 |
| 5,485,611 | 1/1996 | Astle | 395/601 |

*Primary Examiner*—Moustafa M. Meky
*Attorney, Agent, or Firm*—William H. Murray; N. Stephan Kinsella

[57] ABSTRACT

A method and apparatus for branching among a plurality of data sequences received from a relatively high latency mass storage device. According to a preferred embodiment, a plurality of initial data sequences respectively representative of the initial portions of data sequences of the plurality of data sequences are retrieved from the mass storage device, wherein the length of each initial data sequence is selected in accordance with the latency of the mass storage device. The plurality of initial data sequences is stored in a storage device having a low latency relative to the mass storage device. There is determined a next data sequence to be retrieved from the mass storage device when a branch point is reached during a current data sequence. The initial data sequence corresponding to the next data sequence is retrieved from the low latency storage device while the high latency mass storage device locates the next data sequence.

26 Claims, 2 Drawing Sheets

SYSTEM FOR RETRIEVING INITIAL DATA SEQUENCE CORRESPONDING TO NEXT DATA SEQUENCE WHILE LOCATING NEXT DATA SEQUENCE WHEN BRANCH POINT IS REACHED DURING CURRENT DATA SEQUENCE

BACKGROUND OF THE INVENTION

1. Field of the Invention

The present invention relates to signal processing and, in particular, to computer-implemented processes and apparatuses for branching among a plurality of data sequences received from a relatively high latency mass storage device.

2. Description of the Related Art

Signal processing includes processing of both video signals and audio signals, where video signals comprise a sequence of video frames, wherein each video frame represents an image. Data representing such video and audio signals is often stored in compressed digital form on a serial storage mechanism, such as a compact disk-read-only memory ("CD-ROM"). Video and audio data are typically interleaved and synchronized. In many video or audio applications, it is desirable to switch from one data sequence to another in real time, and without visual or aural artifacts.

For example, where a CD-ROM stores a plurality of video sequences, where each video sequences comprises a plurality of sequential video frames, it is desirable to switch among two or more video sequences under user control. In an interactive video application such as a video game, the user, while viewing playback of a first video sequence from the CD-ROM, may enter an input that will cause a second video sequence to be displayed on the monitor. In many uses such as video game applications, a large degree of choices available to a user at different points within given video sequences enhances the richness and interactivity of the application. For example, when a user playing a video game which displays video sequences from a CD-ROM faces a choice, the user may make one of several "branching" choices. Depending upon the user's choice, a new video sequence will be selected for playback from the CD-ROM corresponding to the user's choice.

Various video sequences are stored in varying physical locations on the CD-ROM, however. Mass storage devices such as a CD-ROM drive have a relatively high latency time compared to the rate at which video frames from the CD-ROM are displayed, and thus there can be a significant delay between the user's branching choice and the time that the corresponding chosen sequence begins to be displayed. For example, where video frames are updated at 30 frames per second, at a "choice" moment during video sequence 1, the user's input (or lack thereof) may determine which one of several video sequences 3, 17, or 45 is to be displayed next. If the user's input determines that sequence 17 is to be displayed next, up to a full second may elapse before the CD-ROM drive is physically able to seek out the beginning of video sequence 17 and begin to transmit data from video sequence 17 for decoding into video frames by a processor and display on a video monitor. Such latency delays caused by the latency during transitions between video sequences due to the use of high latency mass storage devices therefore gives rise to artifacts and related problems with the use of such interactive applications.

Various techniques have been utilized to ameliorate this problem. For example, because it is known that a short latency delay will exist during the transition from the end of one video sequence to the beginning of another video sequence, a transition video frame or a relatively short sequence of transition frames, may be stored in random-access memory ("RAM"), which has a negligible latency delay, for display until the next video sequence is located by the CD-ROM drive. Video material can be selected such that there is visual continuity. There is typically little variety in such transition sequences, because the transition frames cannot be easily updated while video is being continuously sourced from the CD-ROM drive. This reduces both the range of video material that can be used for the main video sequences, and the realism conveyed by multiple uses of the transition frames.

In another technique, the stream of data sourced from the CD-ROM can represent two or three distinct video subsequences, with the decoder apparatus, under user control, thus being able to select the desired video sequence at any time with no noticeable latency delay. However, the number of branching choices is limited in this technique, and the visual quality of each video subsequence is reduced relative to the video quality of a normal video sequence which is represented by the whole data stream.

What is needed is an apparatus, system, and method for overcoming the latency problems associated with branching choices when high latency mass storage devices are utilized.

Further objects and advantages of this invention will become apparent from the detailed description of a preferred embodiment which follows.

SUMMARY

There is provided herein a method and apparatus for branching among a plurality of data sequences received from a relatively high latency mass storage device. According to a preferred embodiment of the invention, a plurality of initial data sequences respectively representative of the initial portions of data sequences of the plurality of data sequences are retrieved from the mass storage device, wherein the length of each initial data sequence is selected in accordance with the latency of the mass storage device. The plurality of initial data sequences is stored in a storage means having a low latency relative to the mass storage device. There is determined a next data sequence to be retrieved from the mass storage device when a branch point is reached during a current data sequence. The initial data sequence corresponding to the next data sequence is retrieved from the low latency storage means while the high latency mass storage device locates the next data sequence.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

The present invention utilizes hard disk drives, RAM, and/or other relatively low latency storage means to improve the branching between video sequences stored on relatively high latency mass storage devices such as CD-ROM drives. As described in further detail hereinbelow, in a preferred embodiment a plurality of transition sequences representative of the initial video frames of each video sequence on a CD-ROM is stored in a low latency storage means such as a hard drive. While displaying a first video sequence from the CD-ROM, and a user's choice selects a second video sequence for playback, the transition sequence which represents the initial video frames of the second video sequence is quickly retrieved from the hard drive and displayed while the CD-ROM drive seeks and locates the second video sequence. When the second video sequence is located and synchronized with the transition sequence, the remainder of the second video sequence is received from the CD-ROM drive for further processing and display.

Video Processing System Hardware

Figure 1:
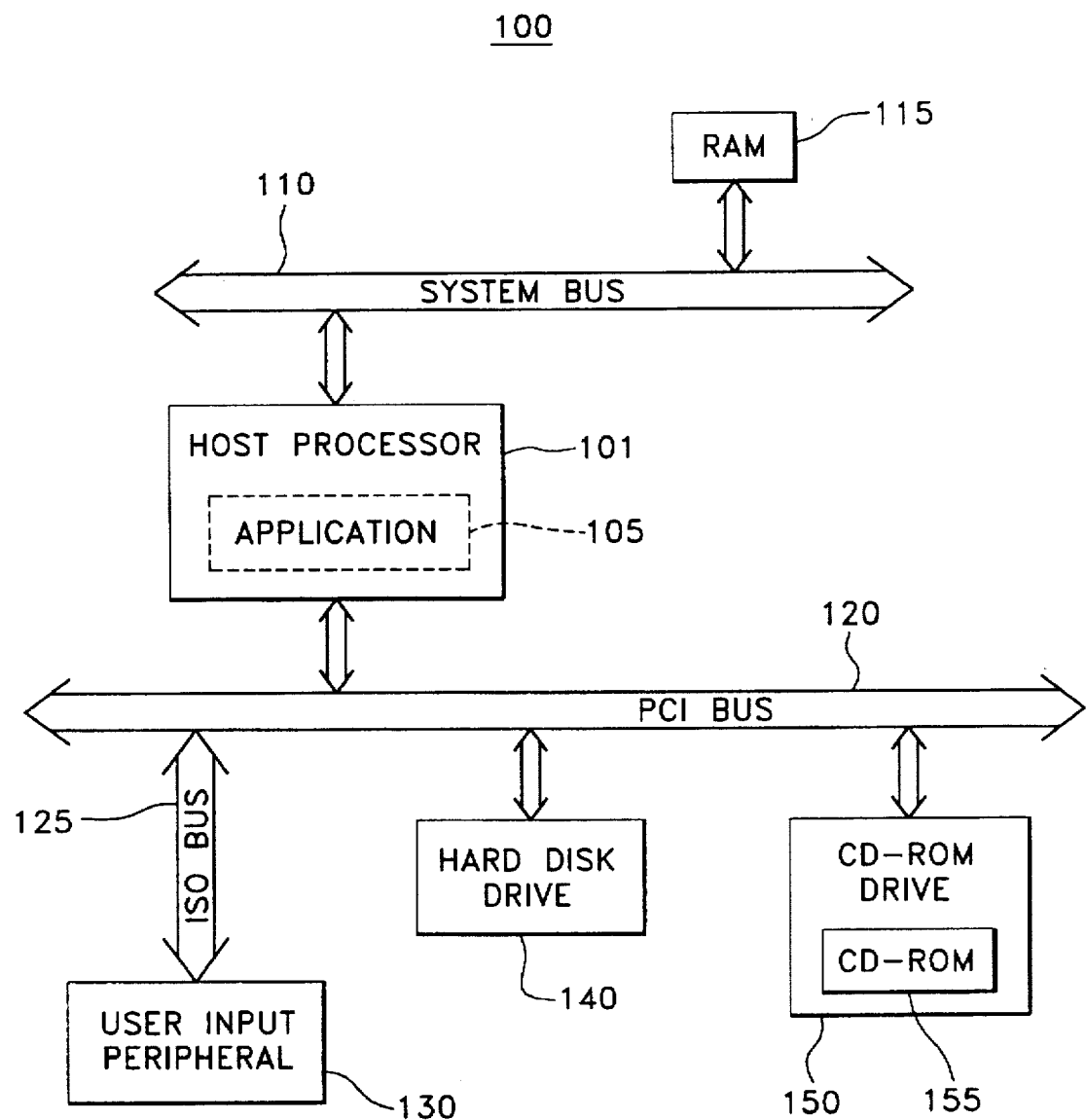
FIG. 1 is a block diagram of a preferred video processing system in accordance with the present invention.

Referring now to FIG. 1, there is shown a block diagram of a preferred video processing system 100 in accordance with the present invention. Video processing system 100 comprises host processor 101, system bus 110, RAM 115, Peripheral Component Interface ("PCI") bus 120, Industry Standard Architecture (ISA) bus 125, user input peripheral 130, hard disk drive 140, and CD-ROM drive 150.

Video processing system 100 is preferably a general purpose microprocessor-based personal computer (PC) system. System bus 110 may be any suitable digital signal transfer device, and may be an ISA bus or Extended ISA ("EISA") bus or a PCI bus. Those skilled in the art will appreciate that the system bus is normally chosen to match characteristics of the microprocessor in use, to achieve the highest speed of transmission over the system bus. User input peripheral 130 may be any device suitable for receiving input from a user, for example, a keyboard, mouse, or joystick. Hard disk drive 140 is suitable for storing a plurality of transition sequences, as described in detail below, and having a latency much lower than that of CD-ROM drive 150. Host processor 101 may be a general-purpose processor suitable for processing video signals, and is preferably an Intel® general purpose microprocessor such as an Intel® i386™, i486™, or Pentium™ processor. Those skilled in the art will appreciate that host processor 101 may also be a special-purpose video processor.

In a preferred embodiment, host processor 101 may run application 105, which can represent, for example, an interactive video application utilized by a user of video processing system 100. In use, host processor 101 can read a stream of data over PCI bus 120 from CD-ROM drive 150 that represents a sequence of video frames. Host processor 101 can also store video frame data to and read video frame data from hard disk drive 140 via PCI bus 120, and can store and retrieve data from RAM 115 via system bus 110. As will be understood by those skilled in the art, processed or decoded video frames may be displayed on a monitor (not shown) for viewing by the user.

Branching Choices and Transition Sequences

Figure 2:
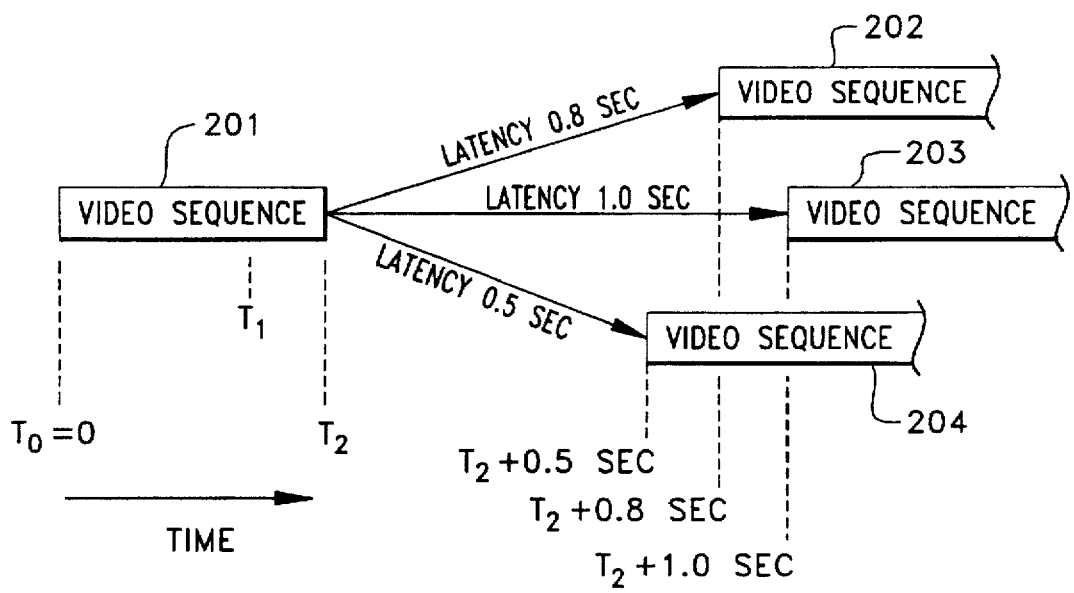
FIG. 2 is a schematic illustration of a branching choice among video sequences.

Referring now to FIG. 2, there is shown a schematic illustration of an exemplary branching choice among video sequences 201, 202, 203, and 204. As will be understood by those skilled in the art, video sequence 201 is a sequence of video frames beginning at time $T_0$. Video sequence 201 may be displayed on a monitor (not shown) for viewing by a user, and comprises video frames decoded from a data stream stored on a CD-ROM 155, which is transmitted from CD-ROM drive 150 of FIG. 1 to host processor 101. Video sequence 201 represents, for example, one of a plurality of video sequences stored on CD-ROM 155, which is displayed during an interactive video application such as a video game.

During the playback of video sequence 201, at certain predetermined moments such as $T_1$ and $T_2$ after the beginning $T_0$ of video sequence 201, a branching choice is presented, where the video sequence to be displayed on the monitor may change to another video sequence depending upon prior or current input from the user. For example, at time $T_1$, any one of several storyline branches within the video game being played may be able to be selected by the user, but the user may do nothing, in which case video sequence 201 continues to play. As a second branching choice time $T_2$, however, the user's input (or lack thereof) may require either video sequence 202, 203, or 204 to be displayed next. For example, video sequence 201 may represent video footage from the user's perspective of the user walking down a tunnel or hallway. At time $T_1$, a door in a left side wall may be visible. If the user were to push a joystick device to the left at or near time $T_1$, a separate video sequence would need to be retrieved from CD-ROM drive 150 to display a different video sequence corresponding to images behind the door. However, if the user does not push the joystick leftwards at this time, video sequence 201 continues as shown.

At time $T_2$, the hallway may terminate at three doors, corresponding to video sequence 202, 203, or 204, one of which the user must select, either actively or by default. It will be appreciated that the data representing video sequences 202, 203, or 204 are located in different and unique physical locations upon CD-ROM 155. Thus, when the user's input at time $T_2$ determines which of video sequences 202, 203, or 204 will be retrieved, decoded, and displayed next, CD-ROM drive 150 requires a certain amount of time to seek this physical sector on CD-ROM 155 and read the data stored thereon to find data corresponding to the video sequence sought. Typically, this latency time is approximately one second or less on CD-ROM devices in usage currently, and is bounded by a maximum latency time for a constrained CD area. As illustrated, the physical locations on CD-ROM 155 of the beginning portions of video sequences 202, 203, or 204 relative to the portion of video sequence 201 corresponding to branching choice time $T_2$ cause latency times of 0.8 seconds, 1.0 seconds, and 0.5 seconds, respectively.

Figure 3:
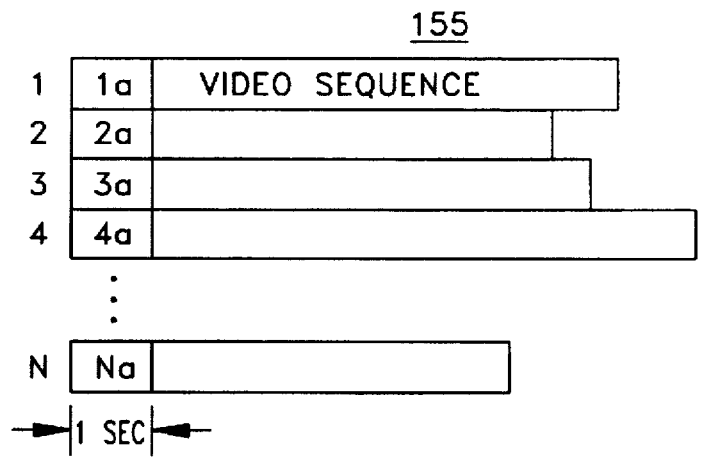
FIG. 3 is an illustration of a plurality of video sequences and corresponding initial sequences in accordance with the present invention.

Referring now to FIG. 3, there is shown is an illustration of a plurality of video sequences 1–N and corresponding initial video sequences $1_a$–$N_a$ in accordance with the present invention. As will be understood, a CD-ROM such as CD-ROM 155 contains a number of video sequences, some of which may be branched to from branch points in other video sequences as described above. Video sequences 1–N are each located in compressed data format in a particular location on CD-ROM 155 that may be read by CD-ROM drive 150, wherein each video sequence of video sequences 1–N may be branched to from another video sequence. As will be appreciated, each video sequence of the plurality of video sequences 1–N may have a unique length, i.e., a unique number of bits corresponding to a unique number of video frames.

In the present invention, to avoid the latency delay which accompanies seeking the beginning of each video sequence of the plurality of video sequences 1–N when a particular video sequence is to be branched to after a branch choice is made, before the interactive video application is begun, an initial sequence of video frames equal in length to the maximum latency time (i.e., approximately one second) is first read from CD-ROM drive 150 and stored in hard disk drive 140, which has a much lower latency time than CD-ROM drive 150. Thus, as illustrated in FIG. 3, initial video sequences $1_a$-$N_a$ are stored and accessible on hard disk drive 140.

Figure 4:
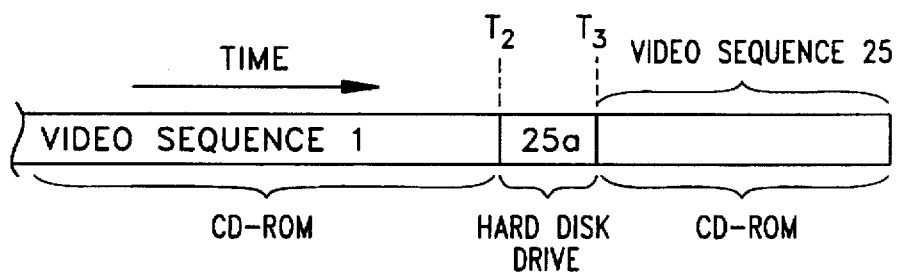
FIG. 4 is a video sequence time line illustrating the method of operation of the present invention.

Referring now to FIG. 4, there is shown a video sequence time line illustrating the method of operation of the present invention. As illustrated in FIG. 4, video sequence 1, which is received from CD-ROM drive 150, is decoded and displayed on a monitor for viewing by the video game user. At branch choice time $T_2$, the user's inputs delivered via user input peripheral 130 causes video game application 105 to determine that video sequence 25 should be branched to and displayed next. Rather than wait up to one second as in the prior art for a CD-ROM drive to find the beginning of video sequence 25, and displaying a repetitive or crude transition scene during this latency interval, video processing system 100 of the present invention virtually instantly begins to display video sequence 25 after time $T_2$, by reading initial video sequence $25_a$ from hard disk drive 140. While initial video sequence $25_a$ is being displayed, CD-ROM drive 150 is locating the beginning portion of video sequence 25 on CD-ROM 155. At time $T_3$, which may be less than or equal to the maximum latency time of one second after time $T_2$, the remainder of the video frames constituting video sequence 25 are received from CD-ROM drive 150.

In this manner, the use of initial video sequences stored on a relatively low latency storage device such as hard disk drive 140 can improve transition when branching from one video sequence to another.

In a preferred embodiment, a CD-ROM such as CD-ROM 155 contains a special physical sector containing all of the initial video sequences $1_a$-$N_a$, for faster and more convenient loading into hard disk drive 140. In a preferred embodiment, when such an initial video sequence sector is provided, video sequences 1-N contain initial video sequences $1_a$-$N_a$ for synchronization and other purposes. However, in alternative preferred embodiments the initial video sequences $1_{a-Na}$ are not completely duplicated within the remainder of video sequences 1-N, to save space, so that each video sequence 1-N contains the data representing the respective video sequence minus the initial video sequence for that video sequence.

In an alternative preferred embodiment, each CD-ROM does not contain a special physical sector storing each initial video sequence. Thus, hard disk drive 140 is loaded with the plurality of initial video sequences $1_a$-$N_a$ by reading the first second of data from the beginning of each video sequence of the plurality of video sequences 1-N. It will be appreciated that CD-ROM 155 may contain an index that facilitates the location of initial video sequences $1_a$-$N_a$ during the loading of hard disk drive 140.

In a preferred embodiment, CD-ROM drive 150 generates data at a rate of approximately 2 Mbits/second, and video processing system 100 displays therefrom approximately 30 frames/second. With current technology, where N=40, approximately 10 Mbytes of space on hard disk drive 140 will suffice to store all 40 initial one-second video sequences $1_a$-$40_a$. The plurality of video sequences 1-N plus other video sequences stored on CD-ROM 155 (for example, video sequences that may not be branched to from other video sequences) can typically occupy ½ Gigabyte of compressed data on CD-ROM 155.

As those skilled in the art will understand, while an initial video sequence such as initial sequence $25_a$ is retrieved from hard disk drive 140, CD-ROM drive 150 may locate video sequence 25 so that the data stream generated by CD-ROM drive 150 may be simultaneously decoded by host processor 101 to yield video frames identical to those being produced from hard disk drive 140. When video frames from hard disk drive 140 and CD-ROM drive 150 are synchronized or substantially synchronized in this manner, host processor 101 may switch from the data stream from hard disk drive 140 to the data stream from CD-ROM drive 150 at any time before the end of initial video sequence $25_a$ is reached. Those skilled in the art will appreciate that such synchronization may be detected when achieved by time-stamping techniques. As will be further appreciated by those skilled in the art, video frames decoded from an initial video sequence such as initial video sequence $25_a$ read from hard disk drive 140 may be buffered temporarily for a small number of video frames into RAM 115 to allow synchronization of video frames from CD-ROM drive 150 with video frames from hard disk drive 140.

As will be understood by those skilled in the art, in alternative preferred embodiments of the present invention, the initial video sequences stored on the low latency storage device such as hard disk drive 140 may be stored in a more compressed format than the data stored on CD-ROM 155. Although the image quality of such video frames decoded from the initial video sequences stored on hard disk drive 140 may be less than video frames decoded from CD-ROM 155, their usage may be acceptable in various applications, since initial video sequences are relatively short compared to the length of most video sequences. Further, this usage may allow more or longer initial video sequences to be stored in a given amount of storage space on hard disk drive 140.

In alternative preferred embodiments, initial video sequences $1_a$-$N_a$, may have different lengths, depending upon the maximum latency time to branch to the corresponding video sequence from any possible previous video sequence. For example, if video sequence 3 of FIG. 3 may be branched to only from video sequences 1 or 2, and 0.8 seconds and 0.6 seconds of latency time is required to branch to video sequence 3 from video sequences 1 and 2, respectively, then an initial video sequence $3_a$ of only 0.8 seconds will suffice to eliminate a problematic transition to video sequence 3. This embodiment may more efficiently utilize hard disk space, but may be more complicated in practice to implement.

Those skilled in the art will also appreciate that, in alternative preferred embodiments, low latency storage devices may be utilized other than hard disk drives. For example, RAM 115 may be utilized if it is available in sufficient quantity to store the plurality of initial video sequences $1_a$-$N_a$. Alternatively, a plurality of video sequences may be designed to have a smaller plurality of initial video sequences, so that less memory is required to store the plurality of initial video sequences, for example where the amount of RAM is limited.

Those skilled in the art will further understand that, although hard disk drive 140 has a much lower latency than does CD-ROM drive 150, hard disk drive 140 may in some implementations have some small amount of latency that is noticeable. This may result where a choice is made at time $T_2$, as illustrated in FIG. 4, and a small latency time is required before hard disk drive 140 is able to find and provide data corresponding to initial video sequence $25_a$. Such a transition delay is much smaller than that produced when utilizing a high latency mass storage device alone, and is therefore an improvement. However, those skilled in the art will appreciate that, in alternative preferred embodiments, RAM 115 may be utilized to store initial video subsequences corresponding to, for example, the first one or two video frames of each initial video sequence of the plurality of initial video sequences $1_a$–$N_a$. Thus, in the manner described above with reference to FIGS. 2–3, when a branching choice is made by a user at time $T_2$, the first few video frames of the next video sequence 25 can be instantly displayed with no latency delay by retrieving these sequences from RAM 115. Thereafter, the remaining frames of initial video sequence 25 are retrieved from hard disk drive 140, decoded and displayed, whereupon CD-ROM drive 150 is switched to at time $T_3$ as described hereinabove, i.e. after CD-ROM drive 150 has had time to find video sequence 25 on CD-ROM 155.

It will further be appreciated that, in alternative preferred embodiments, rather than preloading the entire plurality of initial video sequences $1_a$–$N_a$ in hard disk drive 140 or in other low latency storage devices such as RAM 115, the initial video sequences that can potentially follow a currently displayed video sequence may be loaded and stored during the current video sequences. In this embodiment, any given video sequence may be followed, at the next branch point, by a plurality of video sequences. For example, referring once more to FIG. 2, after time $T_1$, the next branch point is time $T_2$, at which time video sequence 201 may branch to one of video sequences 202, 203, or 204. At any convenient time during the playback of video sequence 201, the bitstream representing video sequence 201 from CD-ROM 155 can "split" to represent two or three video subsequences, one of which is video sequence 201, where the other video subsequence represents the initial video sequences for each of the potential video sequences 202, 203, or 204. In this embodiment, during the initial portion of a video sequence such as video sequence 201, the bitstream will represent video subsequences until all the initial video sequences that might possible follow any of the branch choice points within video subsequence 201 have been loaded into hard disk drive 140 or, alternatively, into RAM 115. After all potential video subsequences are loaded, the bitstream switches back to a bitstream devoted solely to representing video sequence 201. It will be understood that during the time when the bitstream represents video subsequences, each video subsequence may be of reduced image quality.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for branching among a plurality of data sequences received from a relatively high latency mass storage device, the method comprising the steps of:

(a) retrieving from the mass storage device a plurality of initial data sequences respectively representative of the initial portions of data sequences of the plurality of data sequences, wherein the length of each initial data sequence is selected in accordance with the latency of the mass storage device;

(b) storing the plurality of initial data sequences in a storage means having a low latency relative to the mass storage device;

(c) determining a next data sequence to be retrieved from the mass storage device when a branch point is reached during a current data sequence; and (d) retrieving from the storage means the initial data sequence corresponding to the next data sequence while the mass storage device locates the next data sequence.

2. The method of claim 1, wherein the next data sequence is determined in accordance with input received from a user at or before the branch point.

3. The method of claim 1, wherein the mass storage device comprises a compact disk read-only memory drive which reads a compact disk that stores the plurality of data sequences.

4. The method of claim 3, wherein the compact disk comprises an initial sector that stores the plurality of initial data sequences and a data sector that stores the plurality of data sequences.

5. The method of claim 1, wherein the storage means comprises a hard disk drive.

6. The method of claim 1, wherein the storage means comprises random-access memory.

7. The method of claim 1, wherein:

each data sequence represents a video sequence comprising a plurality of video frames; and each initial data sequence represents an initial video sequence representative of a subset of the plurality of video frames of the corresponding video sequence.

8. The method of claim 1, wherein the length of each initial data sequence is approximately equal to the maximum latency of the mass storage device.

9. The method of claim 1, wherein the length of each respective initial data sequence is approximately equal to the maximum latency of the mass storage device solely with respect to branching to the data sequence corresponding to each respective initial data sequence.

10. The method of claim 1, wherein the entire plurality of initial data sequences are retrieved from the mass storage device and stored in the storage means prior to retrieving any complete data sequences from the mass storage device.

11. The method of claim 1, wherein a second plurality of initial data sequences are retrieved from the mass storage device from a data subsequence and stored in the storage means while retrieving a current data sequence from the mass storage device, wherein the second plurality of initial data sequences are a subset of the plurality of initial data sequences and are respectively representative of the initial portions of a second plurality of data sequences that may be branched to from the current data sequence.

12. The method of claim 1, wherein:

each data sequence represents a video sequence comprising a plurality of video frames;

each initial data sequence represents an initial video sequence representative of a subset of the plurality of video frames of the corresponding video sequence;

the mass storage device comprises a compact disk read-only memory drive which reads a compact disk that stores the plurality of data sequences;

the compact disk comprises an initial sector that stores the plurality of initial data sequences and a data sector that stores the plurality of data sequences;

the storage means comprises a hard disk drive;

the next data sequence is determined in accordance with input received from a user at or before the branch point;

the length of each initial data sequence is approximately equal to the maximum latency of the mass storage device; and the entire plurality of initial data sequences are retrieved from the mass storage device and stored in the storage means prior to retrieving any complete data sequences from the mass storage device.

13. An apparatus for branching among a plurality of data sequences received from a relatively high latency mass storage device, the apparatus comprising:

(a) means for retrieving from the mass storage device a plurality of initial data sequences respectively representative of the initial portions of data sequences of the plurality of data sequences, wherein the length of each initial data sequence is selected in accordance with the latency of the mass storage device;

(b) means for storing the plurality of initial data sequences in a storage means having a low latency relative to the mass storage device;

(c) means for determining a next data sequence to be retrieved from the mass storage device when a branch point is reached during a current data sequence; and (d) means for retrieving from the storage means the initial data sequence corresponding to the next data sequence while the mass storage device locates the next data sequence.

14. The apparatus of claim 13, wherein means (c) determines the next data sequence in accordance with input received from a user at or before the branch point.

15. The apparatus of claim 13, wherein the mass storage device comprises a compact disk read-only memory drive which reads a compact disk that stores the plurality of data sequences.

16. The apparatus of claim 15, wherein the compact disk comprises an initial sector that stores the plurality of initial data sequences and a data sector that stores the plurality of data sequences.

17. The apparatus of claim 13, wherein the storage means comprises a hard disk drive.

18. The apparatus of claim 13, wherein the storage means comprises random-access memory.

19. The apparatus of claim 13, wherein:

each data sequence represents a video sequence comprising a plurality of video frames; and each initial data sequence represents an initial video sequence representative of a subset of the plurality of video frames of the corresponding video sequence.

20. The apparatus of claim 13, wherein the length of each initial data sequence is approximately equal to the maximum latency of the mass storage device.

21. The apparatus of claim 13, wherein the length of each respective initial data sequence is approximately equal to the maximum latency of the mass storage device solely with respect to branching to the data sequence corresponding to each respective initial data sequence.

22. The apparatus of claim 13, wherein the entire plurality of initial data sequences are retrieved from the mass storage device and stored in the storage means prior to retrieving any complete data sequences from the mass storage device.

23. The apparatus of claim 13, wherein a second plurality of initial data sequences are retrieved from the mass storage device from a data subsequence and stored in the storage means while retrieving a current data sequence from the mass storage device, wherein the second plurality of initial data sequences are a subset of the plurality of initial data sequences and are respectively representative of the initial portions of a second plurality of data sequences that may be branched to from the current data sequence.

24. The apparatus of claim 13, further comprising:

bus means electrically connected to the apparatus; and memory means electrically connected to the bus.

25. The apparatus of claim 13, wherein:

each data sequence represents a video sequence comprising a plurality of video frames;

each initial data sequence represents an initial video sequence representative of a subset of the plurality of video frames of the corresponding video sequence;

the mass storage device comprises a compact disk read-only memory drive which reads a compact disk that stores the plurality of data sequences;

the compact disk comprises an initial sector that stores the plurality of initial data sequences and a data sector that stores the plurality of data sequences;

the storage means comprises a hard disk drive;

means (c) determines the next data sequence in accordance with input received from a user at or before the branch point;

the length of each initial data sequence is approximately equal to the maximum latency of the mass storage device; and the entire plurality of initial data sequences are retrieved from the mass storage device and stored in the storage means prior to retrieving any complete data sequences from the mass storage device.

26. The apparatus of claim 25, further comprising: bus means electrically connected to the apparatus; and memory means electrically connected to the bus.

* * * * *